US012638650B2

(12) United States Patent
Matiss et al.

(10) Patent No.: US 12,638,650 B2
(45) Date of Patent: May 26, 2026

(54) CABLE SLACK MANAGEMENT APPARATUS FOR CO-PACKAGED OPTO-ELECTRICAL DEVICES

(71) Applicant: CORNING RESEARCH & DEVELOPMENT CORPORATION, Corning, NY (US)

(72) Inventors: Andreas Matiss, Berlin (DE); Tim Grygiel, Berlin (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 607 days.

(21) Appl. No.: 18/096,126

(22) Filed: Jan. 12, 2023

(65) Prior Publication Data
US 2023/0152546 A1      May 18, 2023

Related U.S. Application Data

(63) Continuation of application No. PCT/US2021/040405, filed on Jul. 6, 2021.

(60) Provisional application No. 63/050,895, filed on Jul. 13, 2020.

(51) Int. Cl.
G02B 6/00      (2006.01)
G02B 6/44      (2006.01)

(52) U.S. Cl.
CPC ....... G02B 6/4457 (2013.01); G02B 6/44524 (2023.05); G02B 6/44528 (2023.05); G02B 6/4455 (2013.01)

(58) Field of Classification Search
CPC .............. G02B 6/4457; G02B 6/44524; G02B 6/44528; G02B 6/4455; G02B 6/00
See application file for complete search history.

(56) References Cited

U.S. PATENT DOCUMENTS

| | | | | |
|---|---|---|---|---|
| 8,262,009 | B2 * | 9/2012 | Todd ...................... | H02G 11/02 |
| | | | | 242/378 |
| 8,565,572 | B2 * | 10/2013 | Krampotich ......... | G02B 6/4452 |
| | | | | 385/135 |
| 2006/0045458 | A1 | 3/2006 | Sasaki et al. | |

(Continued)

FOREIGN PATENT DOCUMENTS

| | | | | | |
|---|---|---|---|---|---|
| CA | 2363412 C | * | 4/2007 | .......... | G02B 6/4457 |
| JP | 2011-251810 A | | 12/2011 | | |
| WO | 2017/140725 A1 | | 8/2017 | | |

OTHER PUBLICATIONS

BFCT—Passive Component Fiber Tray, Retreived on Feb. 10, 2023, Retreived from https://www.thorlabs.com/thorproduct.cfm?partnumber=FSR1.

(Continued)

*Primary Examiner* — Jennifer Doan
(74) *Attorney, Agent, or Firm* — Tamika A. Crawl-Bey

(57) ABSTRACT

A cable manager is provided including a base, a cable hub configured to rotate relative to the base, and a directional resistance element configured to allow rotation of the cable hub in a first direction and resist rotation of the cable hub in a second direction, that is opposite the first direction. The cable hub includes a cable slot configured to receive at least one cable, such that when the cable hub is rotated the at least one cable is wound about a periphery of the cable hub.

18 Claims, 14 Drawing Sheets

(56)             References Cited

U.S. PATENT DOCUMENTS

2010/0096486  A1 *    4/2010   Yang ...................... H02G 11/02
                                                                191/12.4
2018/0299632  A1     10/2018   Van Baelen et al.
2019/0079257  A1 *    3/2019   Daoust ............... B65H 75/4471

OTHER PUBLICATIONS

FSR1—Storage Reel for Patch Cables with Ø900 μm Jackets, Retreived on Feb. 10, 2023, Retreived from https://www.thorlabs.com/thorproduct.cfm?partnumber=BFCT.

* cited by examiner

CLOSED – STATE

OPEN – STATE

CABLE SLACK MANAGEMENT APPARATUS FOR CO-PACKAGED OPTO-ELECTRICAL DEVICES

PRIORITY APPLICATIONS

This application claims the benefit of priority of U.S. Provisional Application No. 63/050,895, filed Jul. 13, 2020, and International Application No. PCT/US2021/040405, filed Jul. 6, 2021. The content of each aforementioned priority application is relied upon and incorporated herein by reference in its entirety.

FIELD

This disclosure generally pertains to cable routing, and more particularly to a cable slack management apparatus.

BACKGROUND

In fiber optic networks, fiber optic cables may be connected to various fiber optic assemblies (e.g., hardware, housings, enclosures, etc.). The fiber optic cables may include slack in addition to the cabling needed to make optical connections. This slack may enable the cable to be routed in the fiber optic assembly and/or enable removal of a portion of the cable from the fiber optic assembly, such as to facilitate optical connections, such as splicing and patching. Additionally, the slack may be used to facilitate repairs or reconfigurations in which a portion of the cable may be discarded. The slack may be stored inside the fiber optic assembly in one or more cable management solutions.

Various solutions for cable management and overlength management are available on the market. In most cases, a tray approach is used, which can be arranged and stacked inside the device. Routing functionalities and overlength-management may be realized by manual winding of single fibers around fixed integrated support structure. In some co-packaged optical solutions including high density small form factor switch deployments, cable management is performed by a "fiber shuffle", however these fiber shuffles are highly sophisticated and specific to the switch design resulting in a high volume price and limiting serviceability. One fiber shuffle may connect to multiple input and output connections including multiple active alignment coupling processes. If a coupling fails, the entire fiber shuffle may require replacement.

SUMMARY

In an example embodiment, a cable manager is provided including a cable hub. The cable hub may include a slot into which a cable may be inserted. The cable hub may then be rotated to wind cable slack about the periphery of the cable hub to manage cable slack associated with a telecommunications assembly, such as a fiber optic assembly. The cable manager may also include a directional resistance element configured to allow rotation of the cable hub in a first direction, e.g. a cable winding direction, and resist rotation in a second directions, e.g. an unwinding direction.

In some embodiments, the directional resistance element may prevent or limit "spring back" or unwinding induced by the cable as it is wound about the cable hub. In an example embodiment, the directional resistance element may be a ratchet element. For example, the cable hub or a base may include one or more flexible fingers that cooperate with one or more resistance projections on other of the cable hub or base to prevent unwinding at incremental portions of a turn of the cable hub.

One or more fiber optic cables may be inserted into the cable slot, the cable hub is then rotated, winding the cable about the cable hub and taking up the cable slack in the fiber optic assembly. In some examples, the cable manager may include a lid, such as a slidable lid or hinged lid, configured to prevent or limit the cables from exiting the cable slot inadvertently.

The cable manager may also include one or more mounting features enabling a variety of configurations, such as to enable custom placement and/or stackability. For example, the base may include on or more magnets configured to mount to a metal housing of a fiber optic assembly.

In some example embodiments, the fiber optic assembly may include one or more trays configured to receive the cable manager. The trays may be pivotable to enable access to the fiber optic equipment within the fiber optic assembly and allow for an additional plane, above the fiber optic equipment, for cable management. The cables may be routed to the cable managers in either the open or closed position and the slack wound thereon. Additionally, the trays may include a layer switch feature enabling a cable to pass from a first face to a second face enabling further cable management flexibility.

Additional features and advantages will be set forth in the detailed description which follows, and in part will be apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

Figure 1:
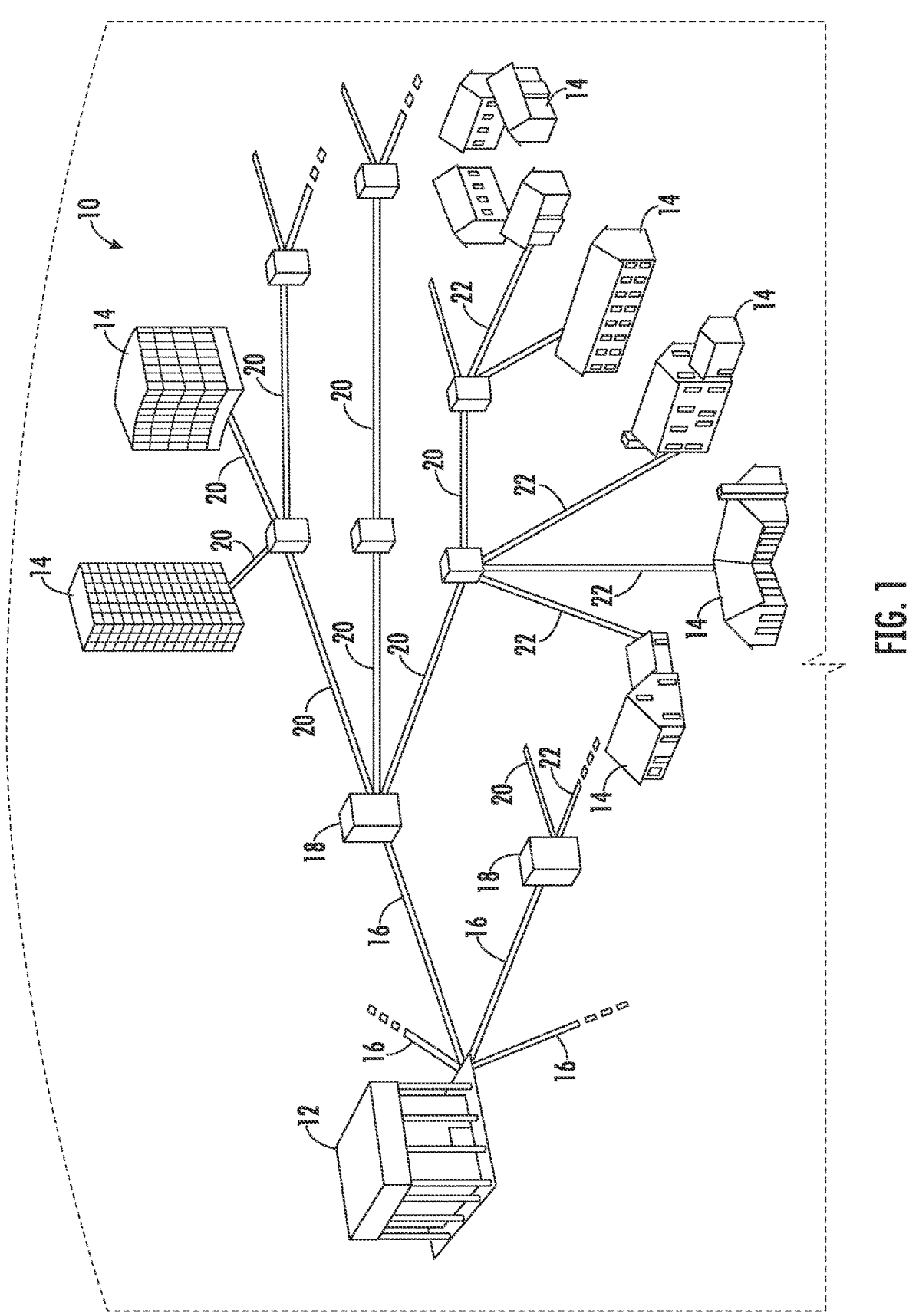
FIG. 1 is a schematic diagram of an exemplary FTTx network according to an example embodiment.

The embodiments set forth in the drawings are illustrative in nature and not intended to be limiting of the scope of the detailed description or claims. Whenever possible, the same reference numeral will be used throughout the drawings to refer to the same or like features. The drawings are not necessarily to scale for ease of illustration an explanation.

DETAILED DESCRIPTION

Optical fibers are useful in a wide variety of applications, including the telecommunications industry for voice, video, and data transmissions. The benefits of optical fiber are well known and include higher signal-to-noise ratios and increased bandwidth compared to conventional copper-based transmission technologies. To meet modern demands for increased bandwidth and improved performance, tele-communication networks are increasingly providing optical fiber connectivity closer to end subscribers. These initiatives include fiber-to-the-node (FTTN), fiber-to-the-premises (FTTP), fiber-to-the-home (FTTH), and the like (generally described as FTTx).

In an FTTx network, fiber optic cables are used to carry optical signals to various distribution points and, in some cases, all the way to end subscribers. For example, FIG. 1 is a schematic diagram of an exemplary FTTx network 10 that distributes optical signals generated at a switching point 12 (e.g., a central office of a network provider) to subscriber premises 14. Optical line terminals (OLTs; not shown) at the switching point 12 convert electrical signals to optical signals. Fiber optic feeder cables 16 then carry the optical signals to various local convergence points 18, which act as locations for splicing and making cross-connections and interconnections. The local convergence points 18 often include splitters to enable any given optical fiber in the fiber optic feeder cable 16 to serve multiple subscriber premises 14. As a result, the optical signals are "branched out" from the optical fibers of the fiber optic feeder cables 16 to optical fibers of distribution cables 20 that exit the local conver-gence points 18.

At network access points closer to the subscriber premises 14, some or all of the optical fibers in the distribution cables 20 may be accessed to connect to one or more subscriber premises 14. Drop cables 22 extend from the network access points to the subscriber premises 14, which may be single-dwelling units (SDU), multi-dwelling units (MDU), busi-nesses, and/or other facilities or buildings. A SDU or MDU terminal may be disposed at the subscriber premises 14. A conversion of optical signals back to electrical signals may occur at the network access points or at the subscriber premises 14.

There are many different network architectures, and the various tasks required to distribute optical signals (e.g., splitting, splicing, routing, connecting subscribers) can occur at several locations. Regardless of whether a location is considered a switching point, local convergence point, network access point, subscriber premise, or something else, fiber optic equipment is used to house components that carry out one or more of the tasks. The fiber optic equipment may be assemblies that include connectors, switches, splitters, splices, or the like. The term "fiber optic assembly" will be used in this disclosure to generically refer to such equipment (or at least portions thereof). In some instances such equip-ment is located at a switching point 12 in an FTTx network, although this disclosure is not limited to any particular intended use. Further, although an FTTx network 10 is shown in FIG. 1, the same considerations apply with respect to other types of telecommunication networks or environ-ments, such data centers and other enterprise network envi-ronments.

With increasing needs for higher bandwidth in telecom-munication or industrial applications, the number of optical inputs and outputs (I/O) rises drastically. A high I/O count has a resulting increase in optical fiber count inside opto-electronical devices, such as switching points 12. Organi-zation and management of single fibers up to high-density optical cable bundles becomes increasingly necessary as the optical fiber count increases. Fiber routing may be applied to ensure traceable, serviceable, and organized fiber manage-ment from optical input to the electronic device observing minimum bend radii. Cable overlength/surplus management may also be utilized because individual I/O routing trace-lengths vary from position to position and cable lengths may be mismatched. Managing high fiber count bundles, for example 92 fibers or 144 fibers, introduces additional chal-lenges because the required fiber bending force is higher compared to individual fibers. Furthermore, optical fibers have a strong spring back tendency and try to straighten if possible, which makes a loose fiber routing difficult.

A cable manager, as described herein, enables overlength and cable routing management for high density cable bundles. The cable manager may include a rotatable cable hub and a directional resistance element, e.g. a fiber locking mechanism that may be locked at the desired rotation position. The cable manager may be configured to enable stacking of a plurality of cable managers, such that cable managers may be placed on top of one another. Additionally, a combination of two cable managers may be collocated to enable clockwise and counter clockwise cable slack management.

Figure 2:
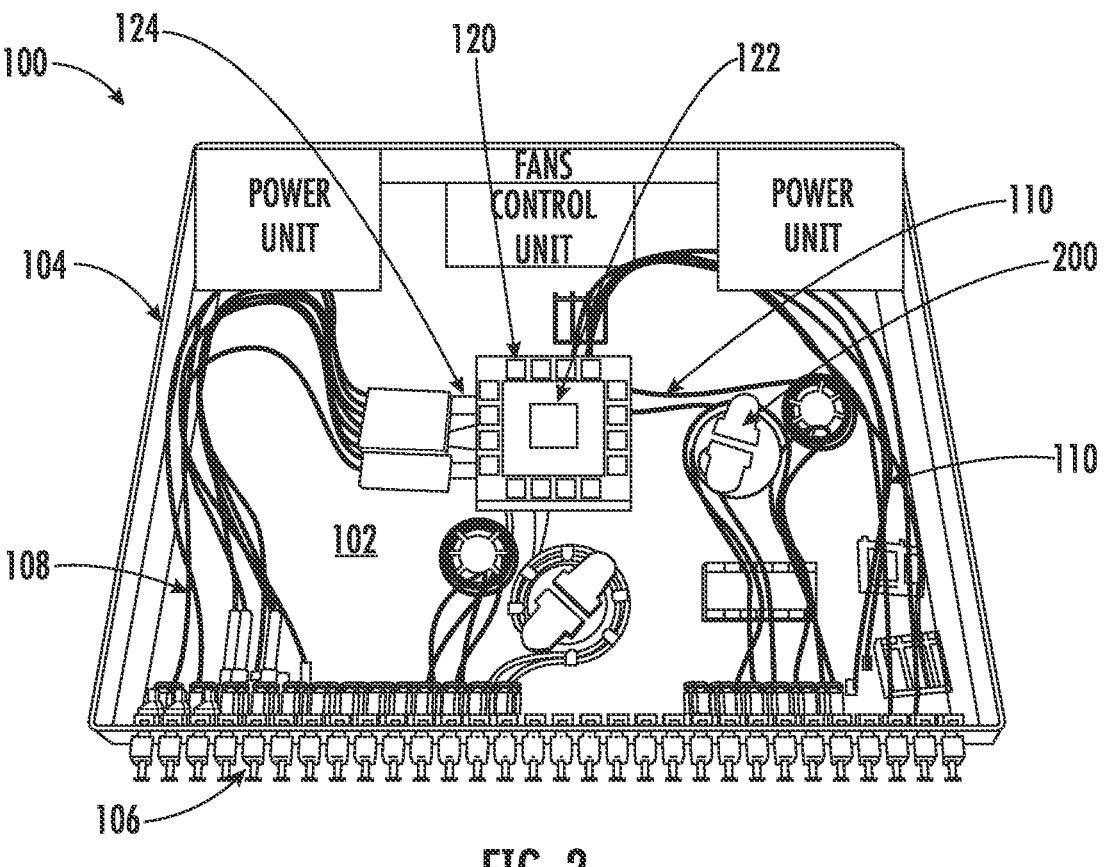
FIG. 2 illustrates an example fiber optic assembly according to an example embodiment.
Figure 3:
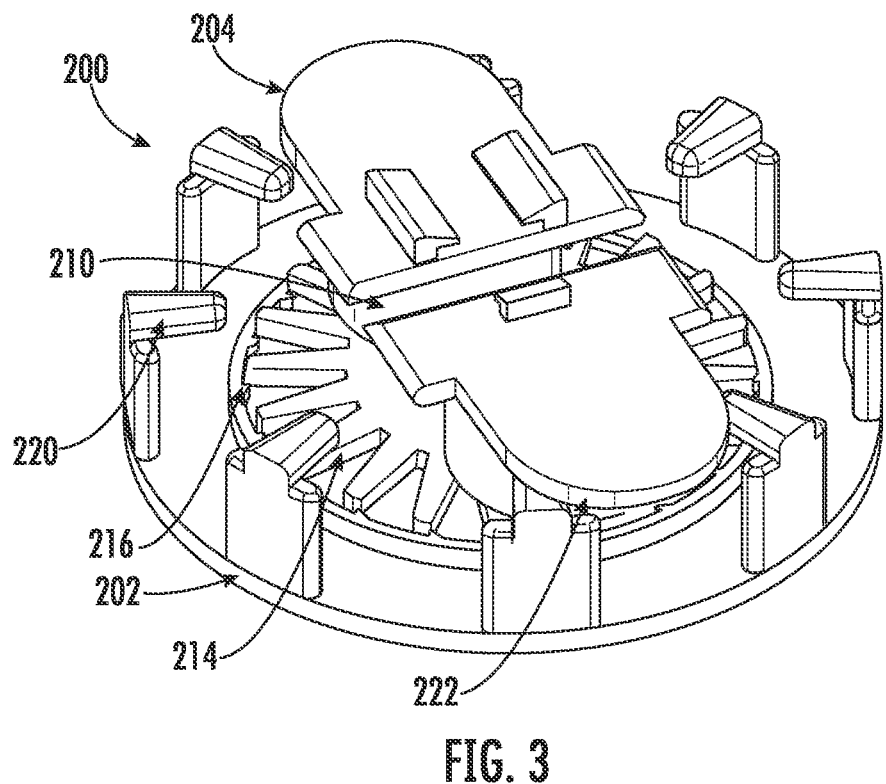
FIG. 3 illustrates a perspective view of an example cable manager according to an example embodiment.
Figure 4:
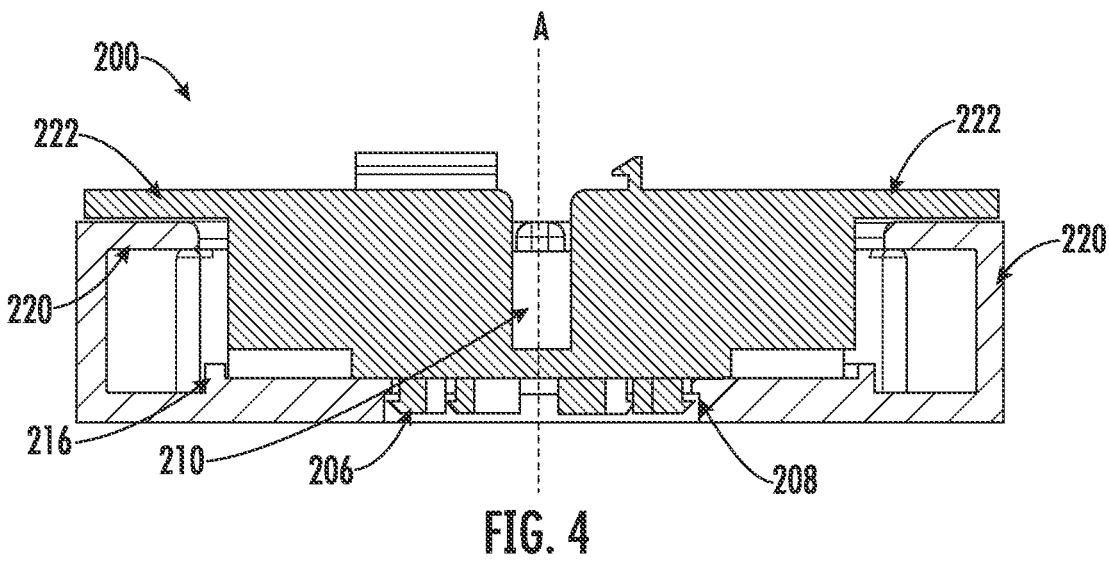
FIG. 4 illustrates cross-sectional view of the cable manager of FIG. 3 according to an example embodiment.

Turning to FIG. 2 an example fiber optic assembly 100 is provided including a plurality of cable managers 200. The depicted fiber optic assembly 100 is a switching point 12, however it should be understood that the cable manager 200 may be used in any fiber optic assembly, such as LCPs, MDUs, or the like.

The depicted fiber optic assembly 100 is a co-packaged opto-electrical switching device including a 16 by 72 fiber electro optical converter. The fiber optic assembly 100 may include a housing having a base 102 and one or more sidewalls 104 extending from the base 102. The fiber optic assembly 100 may also include an adaptor panel 106 configured to receive one or more optical adaptors, such as multi-fiber push-on/pull-off (MPO) adapters (e.g., according to IEC 61754-7). Each of the optical adaptors may be configured to receive a corresponding fiber optic connector. One or more input cables 108 or output cables 110 may extend from the fiber optic adaptors to a switch 120. The switch 120 may include a switch application-specific integrated circuit (ASIC) 122 disposed on a circuit substrate. The circuit substrate may connect the switch ASIC 122 to one or more fiber array units (FAUs) 124. The FAUs may include the terminal end of a plurality of optical fibers of the input cables 108 or output cables 110.

The input cables 108 and/or output cables 110 may comprise a plurality of fiber optic cables disposed within a protective jacket, such as depicted input cables 108, or may be a high density fiber bundle, such as the depicted output cables 110. Additionally or alternatively, the cables may include one or more individual optical fibers or fiber ribbons. The input cables 108 and/or output cables 110 may be routed from the switch 120 to the adaptor panel 106 along the base 102, sidewalls 104, and/or a routing tray, as discussed below in reference to FIGS. 11-18. In some cases, the input cables 108 or output cables 110 may include a significant amount of excess length of cable slack. A cable manager 200 may be utilized to store the cable slack to enable a neater and more accessible fiber optic assembly 100. Additionally, storage of the cable slack on a cable manager 200 may reduce or eliminate damage to an optical fiber due to shifting placement for access to components, heat, or the like. The cable manager 200 may be disposed on the base 102 the sidewall 104, or on a routing tray.

FIGS. 3-8 illustrate an example embodiment of a cable manager 200. The cable manager 200 may include a base 202 and a cable spool or cable hub 204. The base 202 may be affixed to the base 102, sidewall 104, or routing tray of the fiber optic assembly 100, or may be integral to the same. The cable hub 204 may be configured to rotate relative to the base 202. For example, the base 202 may include spindle and the cable hub 204 may include a receiver, such that the cable hub 204 rotates about the spindle. In another embodiment, the cable hub 204 may include a plurality of hooks 206 configured to engage an aperture or socket 208 disposed in the base 202. The hooks 206 may extend from the bottom of the cable hub 204 and flex to allow insertion into the socket 208. The hooks 206 may be disposed in a generally circular configuration to enable rotation of the cable hub 204 relative to the base 202. In some example embodiments, the socket 208 may include a lip to enable the hooks 206 to rotate in the socket 208 without extending beyond a plane defined by the bottom of the base 202, enabling mounting the base 202 without interference by the hooks 206. It should be understood that that although elements, such as the hooks 206, socket 208, spindle, and receiver, are shown and described in associated with the base 202 or the cable hub 204, these are merely examples and the opposite configuration is also contemplated.

Figure 9:
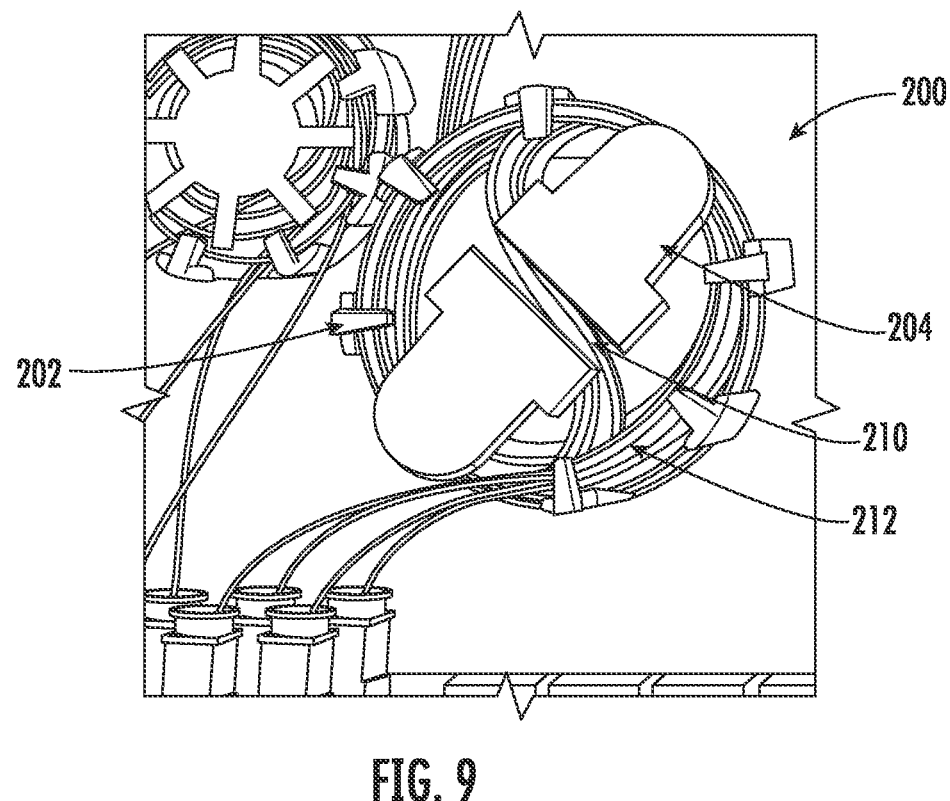
FIG. 9 illustrates a top down view of an example cable manager including a plurality fiber optic cables according to an example embodiment.
Figure 10:
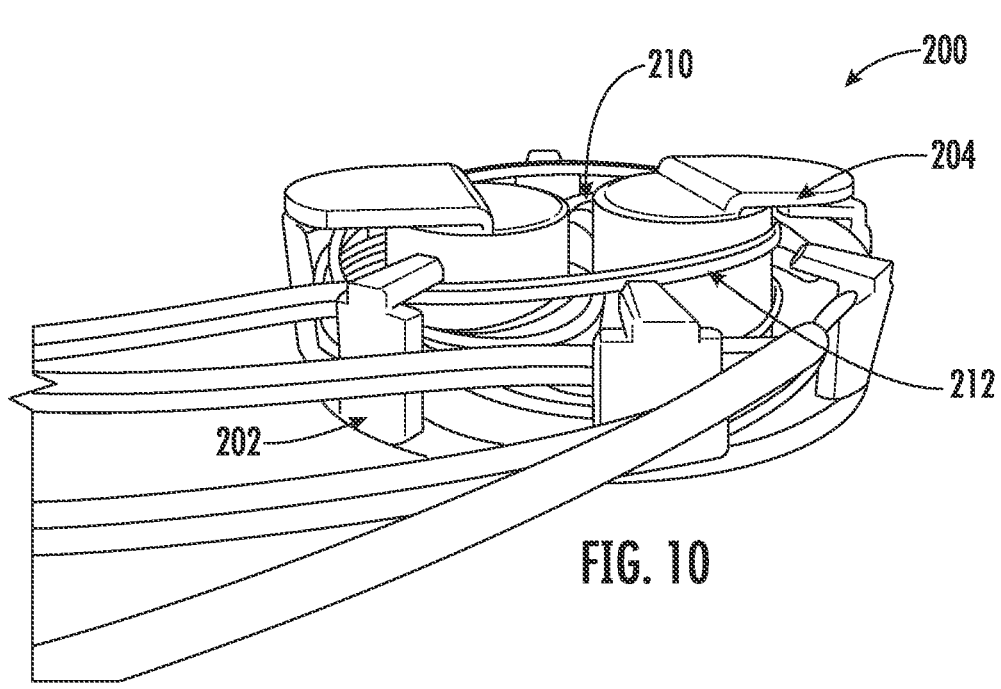
FIG. 10 illustrates a perspective view of an example cable manager including a plurality fiber optic cables according to an example embodiment.

The cable hub 204 may include a cable slot 210 configured to receive one or more cables, such as individual optical fibers or fiber optic cables, ribbon cables, or the like. The cables 212 may be inserted to the cable slot 210 from the top of the cable hub 204, such that when the cable hub 204 is rotated the cables 212 wind around the periphery of the cable hub 204, as depicted in FIGS. 9 and 10.

As the cable is wound about the cable hub 204 a spring back pressure may be built up by the cables 212. The cable manager 200 may include a directional resistance element configured to allow rotation of the cable hub 204 in a first direction, e.g. a winding direction, and resist rotation of the cable hub 204 in a second direction, e.g. an unwinding direction. The resistance element may limit or prevent unwinding of the cables 212 due to the spring back pressure. In an example embodiment, the directional resistance element may include a ratchet element configured resist rotation in the second direction in incremental portions of a turn of the cable hub 204. For example, the ratchet element may include one or more fingers 214 extending from the cable hub 204 configured to engage one or resistance projections 216 disposed on the base 202. The fingers 214 may be configured to flex or bend as the cable hub 204 is rotated, such that the fingers 214 will "snap over" the resistance projections 216. In some examples, the resistance projections 216 may be tapered to enable rotation in the first direction. For example, a leading face may have a taper configured to encourage the fingers 214 to flex horizontally, e.g. in a plan parallel with the base 202, and have a generally flat trailing face, which resists movement in the unwinding directions. Additionally or alternatively, the resistance projections 216 may include a taper, similar to a ramp, configured to cause the finger to flex vertically, e.g. in a plane perpendicular to the base 202. It should be understood that although the configuration of the fingers 214 and resistance projections 216 is depicted and described in associated with the base 202 and the cable hub 204, these are merely examples and other configurations including combinations and opposite configurations are also contemplated.

In some example embodiments, the base 202 may include one or more base cable hooks 220 configured to resist vertical movement of the cables 212, e.g. away from the base 202 parallel to the axis of rotation A of the cable hub 204. The base cable hooks 220 may include a first portion extending away from the base 202 and a second portion extending parallel to the base 202 and disposed at the distal end of the first portion. Alternatively, the base cable hooks 220 may include a curved structure or may be disposed at an angle relative to the base 202. Additionally or alternatively, the cable hub 204 may include one or more hub cable hooks 222 that are configured to restrict vertical movement of the cables 212 away from the base 202. In one such embodiment, the hub cable hooks 222 may comprise a projection extending from a distal end of the cable hub 204 generally parallel to the base 202.

Figure 5:
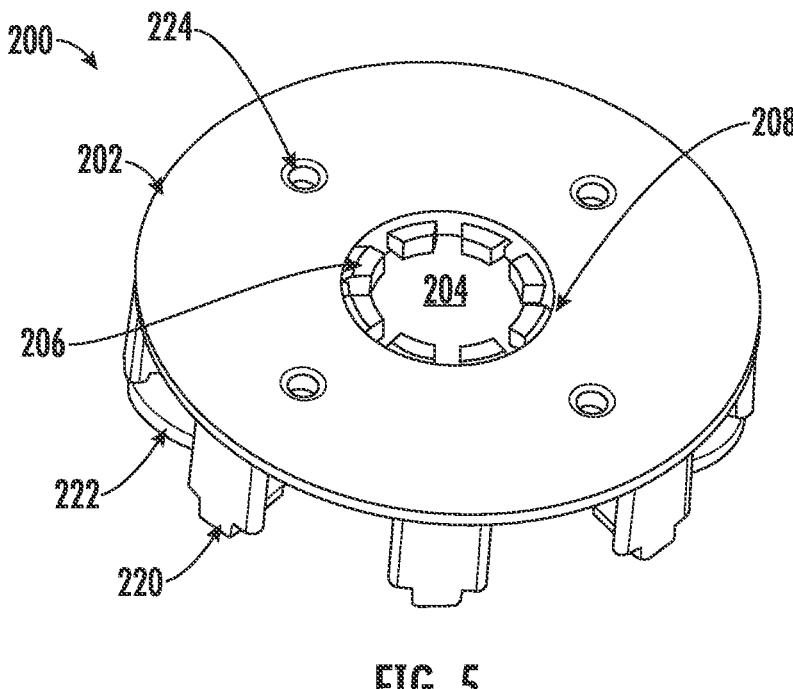
FIG. 5 illustrates a bottom perspective view of the cable manager of FIG. 3 according to an example embodiment.
Figure 6:
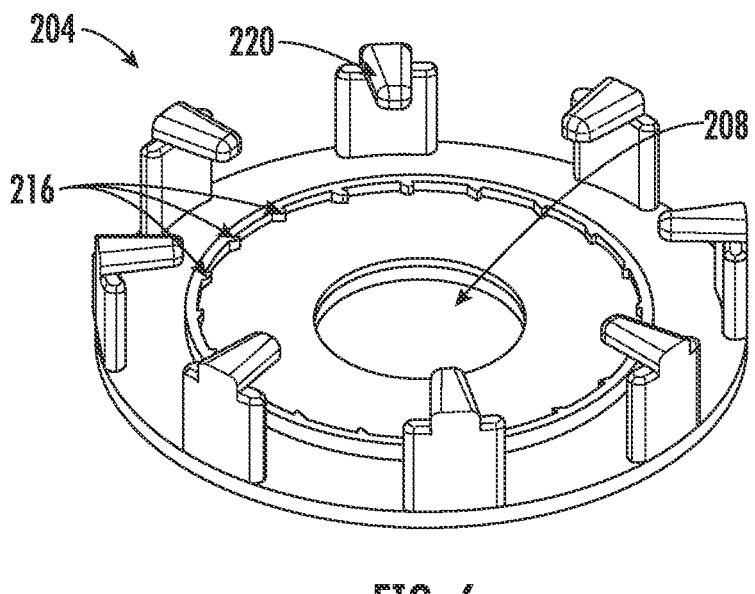
FIG. 6 illustrates a perspective view of a base of the cable manager of FIG. 3 according to an example embodiment.

Turing to FIG. 5, the base 202 may include one or more mounting features 224. The mounting features 224 may be configured to selectively mount the base 202 to the base 102 the sidewall 104, or on a routing tray of the fiber optic assembly 100. In an example embodiment, the mounting features 224 may include fastener apertures, or holes, configured to receive screws, quarter turn fasteners, or the like.

In some embodiments, the mounting features 224 may include a magnet mould and a magnet disposed therein. The magnetic mounting feature may provide substantial flexibility in placement of the cable manager 200 in a fiber optic assembly, which may be especially advantageous when cable routing is unknow or variable. In some example embodiments such as when a cable routing has been determined for a particular fiber optic assembly 100, an adhesive may be used to affix the cable manager 200 to the fiber optic assembly 100 in a desired position. In a further example, the mounting features 224 may be configured to connect to the top of a second cable manger 200, e.g. enable stacking of cable managers 200. The mounting features 224 may include opposing tabs, snap fits or the like. During installation an installer may wind the cable 212 about the cable hub 204 and then engage the cable manager 200 to another cable manager 200. Alternatively, the cable manager 200 may be engaged with the second cable manager 200, and the installer may hold a base 202 of the cable manager 202 being wound to prevent rotational torque from being applied to the other cable manager 200.

Figure 7:
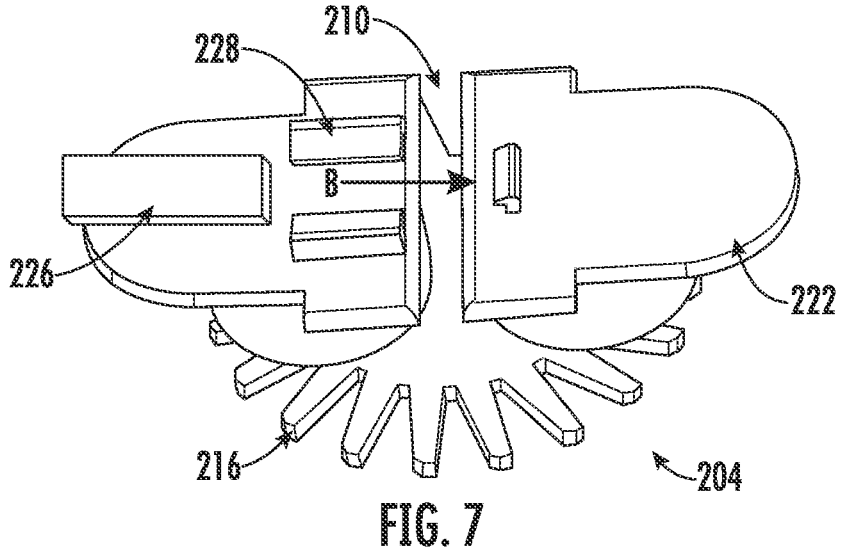
FIG. 7 illustrates a top perspective view of a cable hub of the cable manager of FIG. 3 according to an example embodiment.
Figure 8:
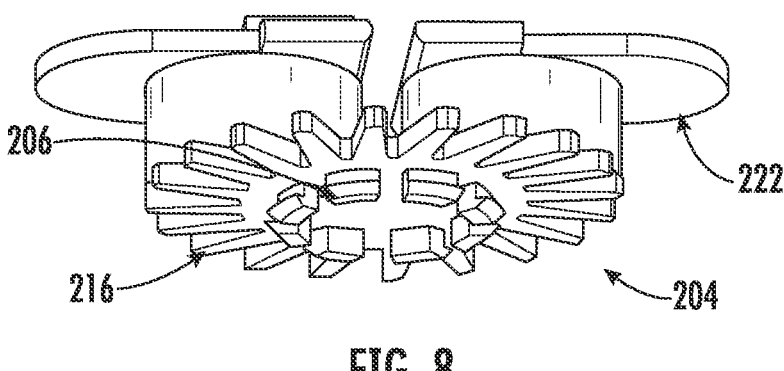
FIG. 8 illustrates a bottom perspective view of a cable hub of the cable manager of FIG. 3 according to an example embodiment.

In FIGS. 7 and 8 an example cable hub 204 is depicted. The cable hub 204 includes a lid 226 configured to cover at least a portion of the cable slot 210 to limit of prevent inadvertent removal of cables 212 from the cable slot 210. In the depicted embodiment, the lid 226 is a generally rectangular plastic element that engages with a plurality of retention tabs 228 disposed on a top face of the cable hub 204. The retention tabs 228 may define a receiving space configured to slidably accept the lid 226. In some embodiments, the lid 226 may be interference fit with the retention tabs 228. In other embodiments, the lid 226 may comprise a hinged element attached to one side of the cable slot 210 that is folded over the cable slot 210, when in use. The lid 226 may include snap features that engage complementary snap features, e.g. tabs, apertures, or the like, on the top face of the cable hub 204 to retain the lid 226 in a closed position.

In some example embodiments, the cable hub 204 may be configured to limit cable bend radii from exceeding a predetermined minimum radius, such as 14 mm, 12 mm, 10 mm, 8 mm, or the like. In an example embodiment, the periphery of the cable hub 204 may have a radius of approximately the predetermined radius. In the depicted embodiment, the cable slot 210 also includes bend radius protection, such that the cable hub 204 comprises two substantially cylindrical structures. The two substantially cylindrical structures of the cable hub 204 may each have a radius approximately the predetermined radius.

In some example embodiments, the space available inside the fiber optic assembly 100 may be very limited. Continuing with the switch example discussed in FIG. 2, the fiber optic assembly 100 may include cooling blocks and copper heat pipes and may need open space for air flow. Additionally, the plane of the base 102 may be populated by electronic components. In the example embodiments discussed in FIGS. 11-18 one or more trays are provided to provide additional cable routing surfaces, e.g. a cable routing plane internal to a housing of the fiber optic assembly 100, but out of the plane of fiber optic components. The input and output optical cable length may be managed to the desired length needed to access the ASIC printed circuit board assembly (outgoing cable) and face plate (incoming cable). The management of the cables can be done inside or outside the switch housing. If the cable management is performed outside the housing, a pre-loaded tray may be installed into the mount and the cables connected to the ASIC and faceplate. If the cable management is performed inside the switch housing, the cable connections may be made and the cables routed, then the cable slack may be would about a cable manager 200 on the tray. In this way, the overlength management ability of the cable managers and trays is flexible and various switch designs, or other fiber optic assemblies, may be served.

The management of the optical breakout cables may be performed individually and independent of other cables. This independent management enables rework or serviceability, e.g. removal and reinstallation of a cable, in case if defect during the connection step. Additionally, due to the overlength management capability the switch connectorization may be completed with a single or a small amount of different break-out cable lengths. The limited number of cable lengths may reduce product version.

Figure 11:
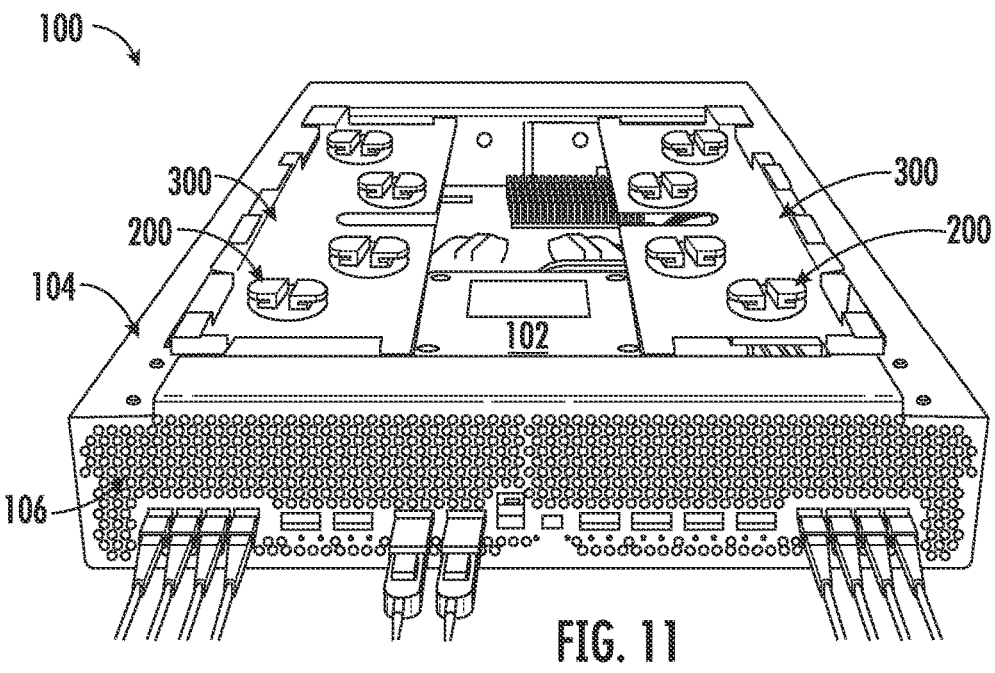
FIG. 11 illustrates perspective view of a fiber optic assembly including pivotable trays in a closed position according to an example embodiment.
Figure 12:
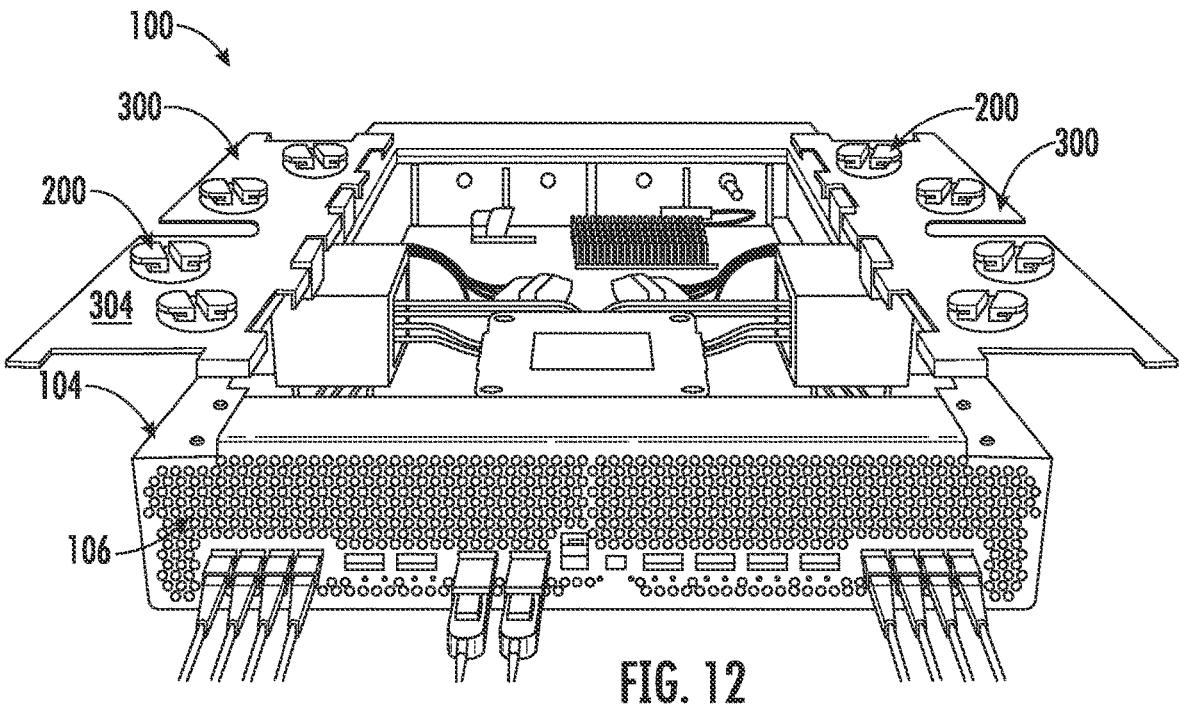
FIG. 12 illustrates perspective view of the fiber optic assembly including pivotable trays in an open position according to an example embodiment.
Figure 13A:
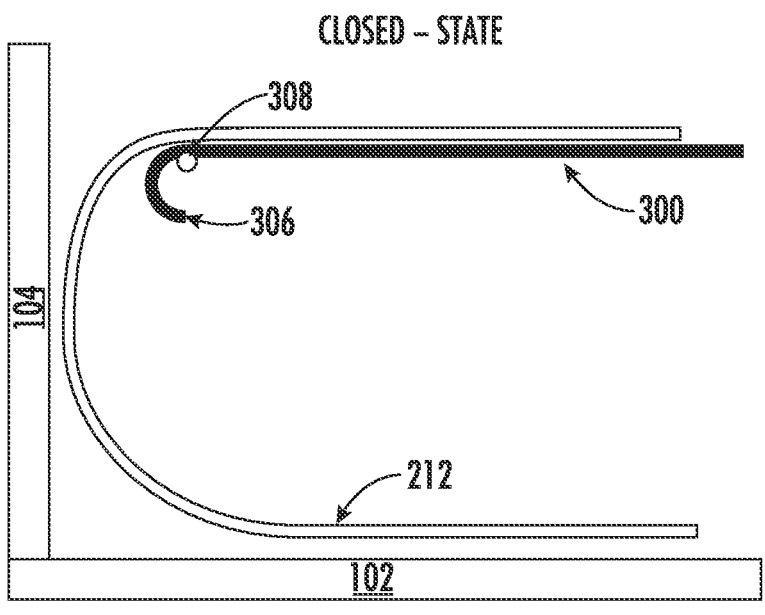
FIGS. 13A and 13B illustrate a cross-sectional view of a tray in the closed position and the open position, respectively, according to an example embodiment.
Figure 13B:
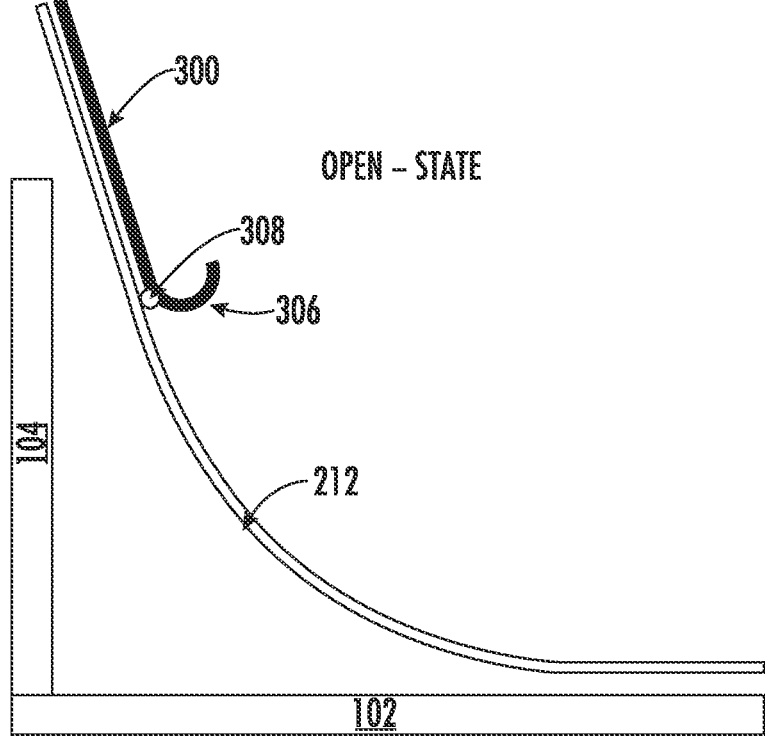

FIG. 11 illustrates an example fiber optic assembly 100, here a switch point 12, including pivotable trays 300. The trays 300 may be substantially planar having a first face 302 and a second face 304. The trays 300 may be formed from metal, such as sheet metal steel or aluminum, plastic, such as injection molded plastic, or other suitable material. The trays 300 may be pivotably mounted at a distal end of a sidewall 104, such that the tray 300 allows access to the fiber optic assembly 100 in an open position (depicted in FIG. 11) and limits access to the fiber optic assembly 100 in a closed position (depicted in FIG. 12). One or more cable managers 200, as described above in reference to FIGS. 3-10 may be disposed on the first face 302 and or the second face 304 of the tray 300, to enable management of cables 212 routed to various fiber optic components of the fiber optic assembly 100.

In an example embodiment, the trays 300 may be disposed below a plane defined by the distal end of the sidewalls 104, when in the closed position. By positioning the trays 300 below the plane of the sidewalls 104, the cable managers 200 may be mounted to the first face 302 of the tray 300 without interfering with a fit or outer dimensions of a cover of the fiber optic assembly 100.

Figure 14A:
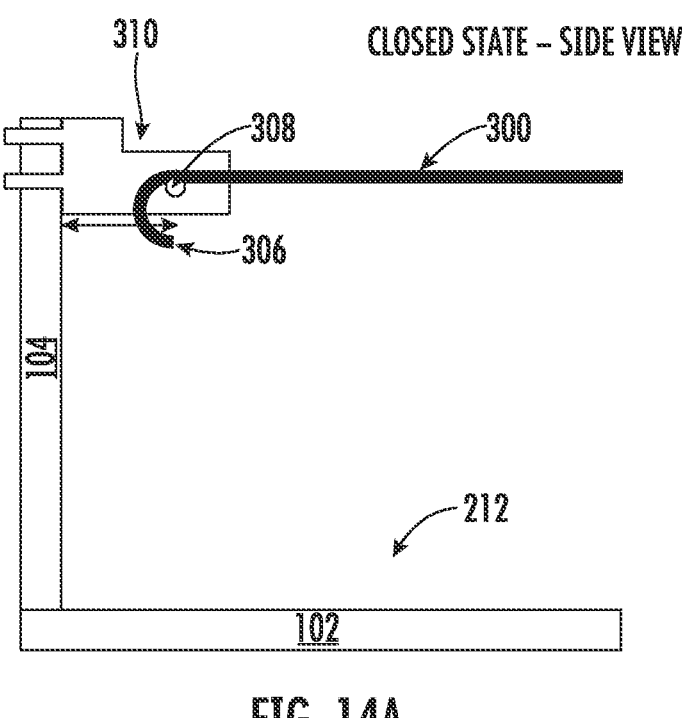
FIGS. 14A and 14B illustrate a cross-sectional view of a tray including a tray mount in the closed position and the open position, respectively, according to an example embodiment.
Figure 14B:
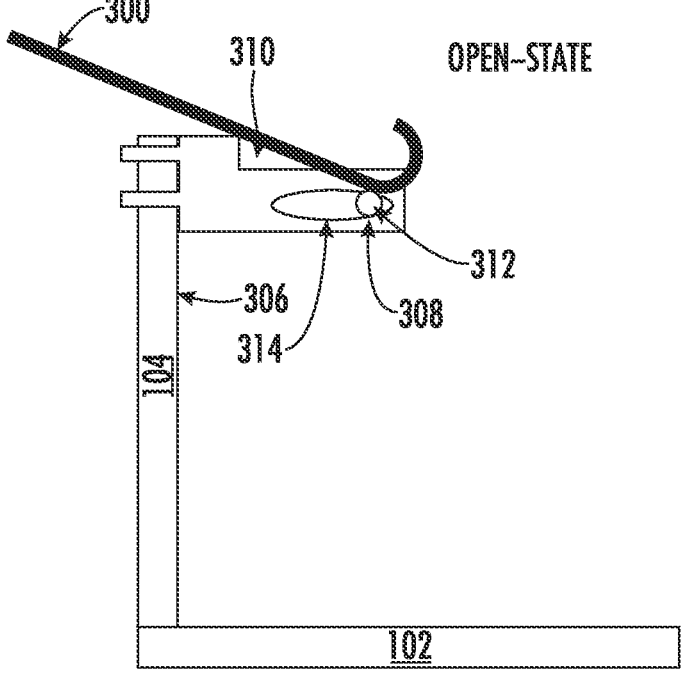

Turning to FIGS. 13A-14B, the trays 300 may include a kink prevention or fiber protection feature 306. The fiber protection feature may 306 be disposed between the sidewall 104 and a tray pivot 308. The fiber protection feature 306 may be a rounded end of a tray 300, such that end of the tray 300 is folded under itself, such that when the tray 300 is rotated to the closed position the tray 300 does not present a sharp edge to the cable 212. The rounded or folded over edge of the tray 300 may be formed by injection molding, in the case of plastic tray material, or bending in the case of metal tray material. Additionally, the tray 300 may rotate about a pivot 308 mounted at a predetermine offset distance from the sidewall 104. The predetermined offset distance may result in a gap being present between the sidewall 104 and the fiber protection feature 306 throughout the rotation of the tray 300 from the open position to the closed position. As depicted in FIGS. 14A and 14B, a tray mount 310 may be provided to support the tray 300 and provide the pivot 308. A proximal end of the tray mount 310 may be coupled to the sidewall 104, such as by fasteners, snap fit, adhesive or the like. A distal end of the tray mount 310 may include the pivot 308, such as a pin 312 or aperture 314, corresponding to a complementary aperture or pin of the tray 300, as depicted in FIG. 14B. In some embodiments, the tray 300 may be selectively mounted in the fiber optic assembly 100, such that the tray 300 may be inserted pre-populated with cables 212, or may be removed for repair or service. For example, the tray 300 may be flexible, such that flexion of the tray 300 may allow the pins 312 to withdraw from the apertures 314 and release of the flexion may cause the pins 312 to be inserted into the apertures 314. Additionally or alternatively, the pins 312 may be biased toward an extended position, such as by a spring. The tray mount 310 and/or the tray 300 may include a tab or other element configured to compress the spring and thereby retract the pin 312. In some example embodiments, the aperture 314 may include a plate to close the aperture 314, which may be removed by rotation, sliding, or removal of fasteners. In some embodiments, the aperture 314 may be disposed on the tray mount 310 and be elongated, such that the pin 312, and associated pivot 308, may move toward and/or away from the sidewall 104. Movement of the pivot 308 may enable an increased open angle of the open position of the tray 300, resulting in increased access to the second face 304 of the tray 300.

Figure 15:
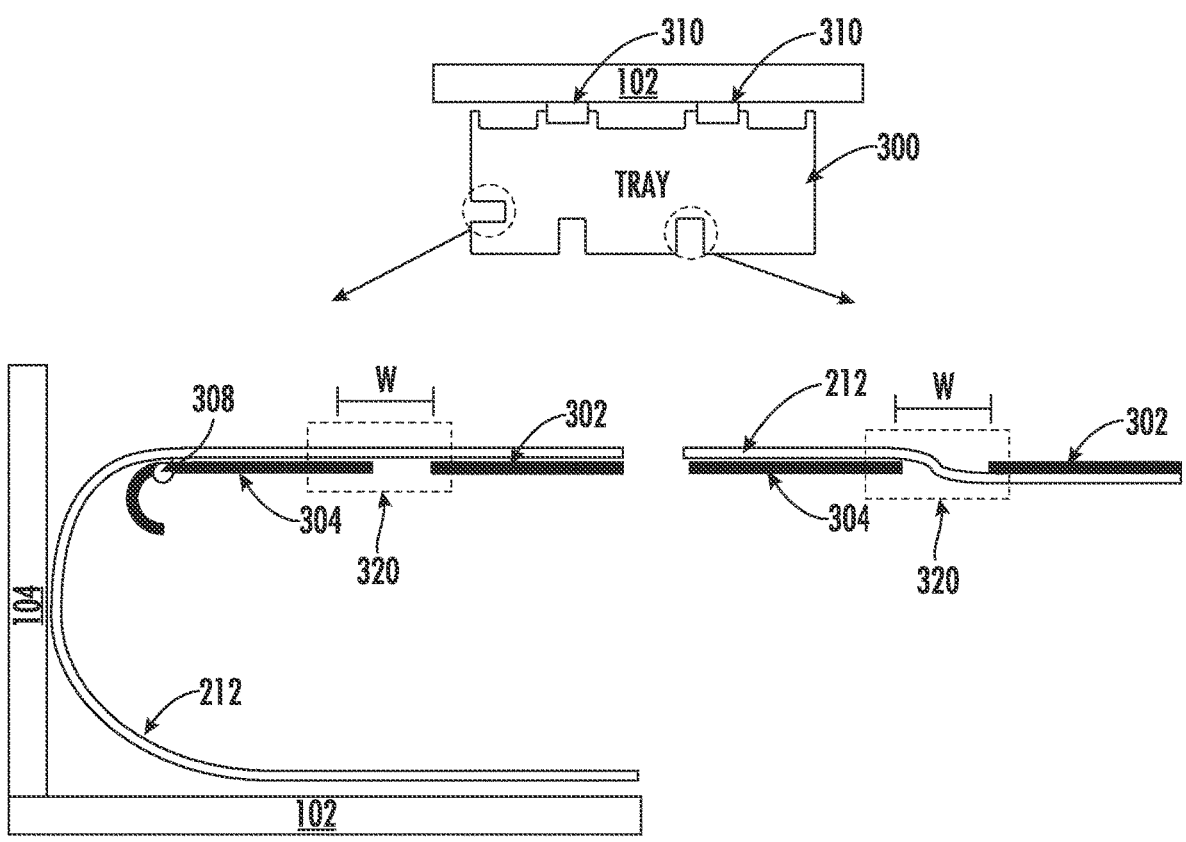
FIG. 15 illustrate top view of a tray including a plurality of layer switch features according to an example embodiment.

In some example embodiments, one or more of the trays 300 may include a layer switch feature 320 configured to enable a cable to pass from the first face 302 to the second face 304, or from the second face 304 to the first face 302. The layer switch feature 320 may include an aperture or a slot disposed through the tray 300. The layer switch feature 320 may be disposed at an edge of the tray 300 or may be located elsewhere on the tray 300. In the example depicted in FIG. 15, a layer switch features 320 are disposed at edge locations including one layer switch feature 320 disposed at a side edge and two layer switch features 320 disposed along a distal edge of the tray 300, opposite the tray mount 310. The layer switch features 320 comprise slots at the described edge locations. In some embodiments, slots may be preferable over apertures, due to the ease of installation and removal of the cable 212 laterally, instead of pull through. Lateral insertion of the cables 212 into the slots may reduce risk of damage to the cable, due to pull through. Details A and B of FIG. 15 depict the cable 212 passing from the first face 302 of the tray 300 to the second face 304 of the tray 300. The width W of the layer switch feature 320 may be sufficient to limit or prevent exceeding a minimum bend radius of a cable 212, as the cable 212 passes from the first face 302 to the second face 304.

Figure 16:
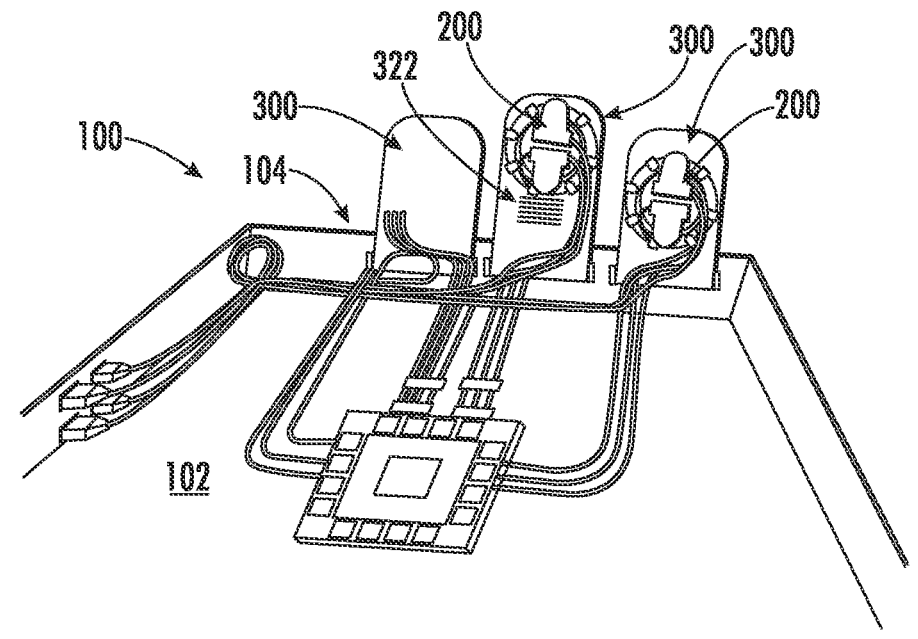
FIG. 16 illustrates a perspective view of a fiber optic assembly including a plurality of trays having cable managers according to an example embodiment.

FIG. 16 depicts an example embodiment of a fiber optic assembly 100 including a plurality of trays 300 disposed on a sidewall 104. Each of the plurality of trays 300 having one or more cable managers 200. The multiple trays 300 per sidewall 104 configuration may enable a lower cable count per tray 300 and reduce complexity of repair or service. In some embodiments, the tray 300 may include splice protection holder 322 in addition to the cable managers 200.

Figure 17:
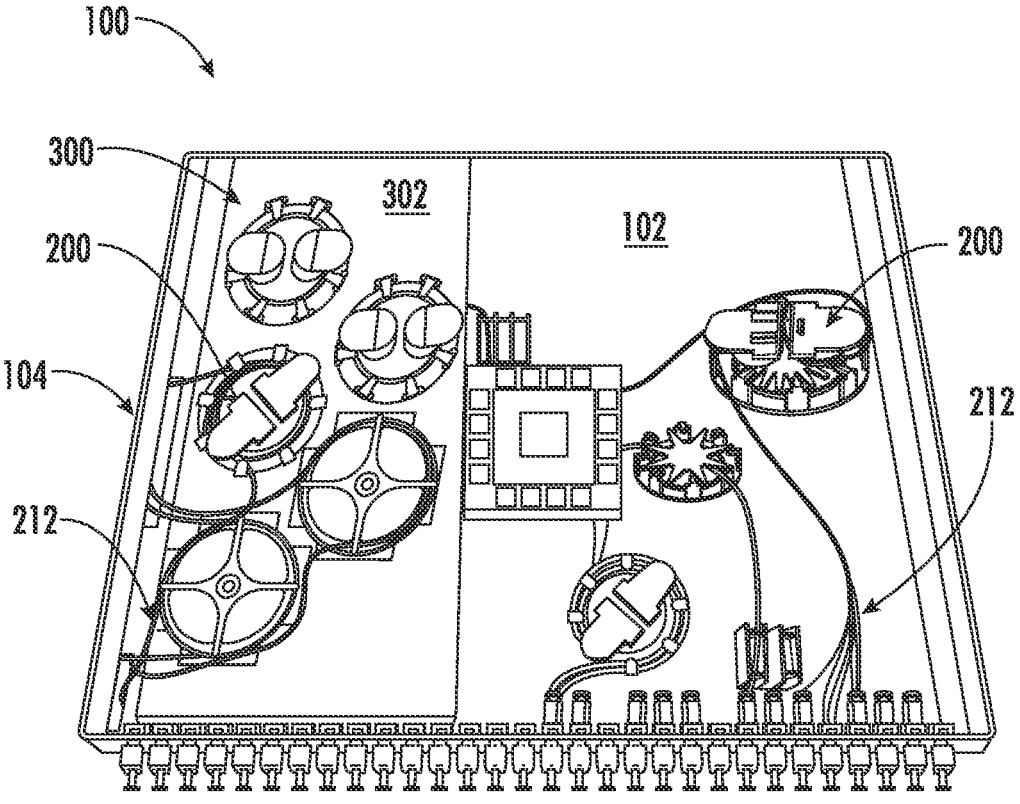
FIG. 17 illustrate top views of an example fiber optic assembly including cable managers on a tray and on a housing including a plurality of fiber optic cables according to an example embodiment.
Figure 18:
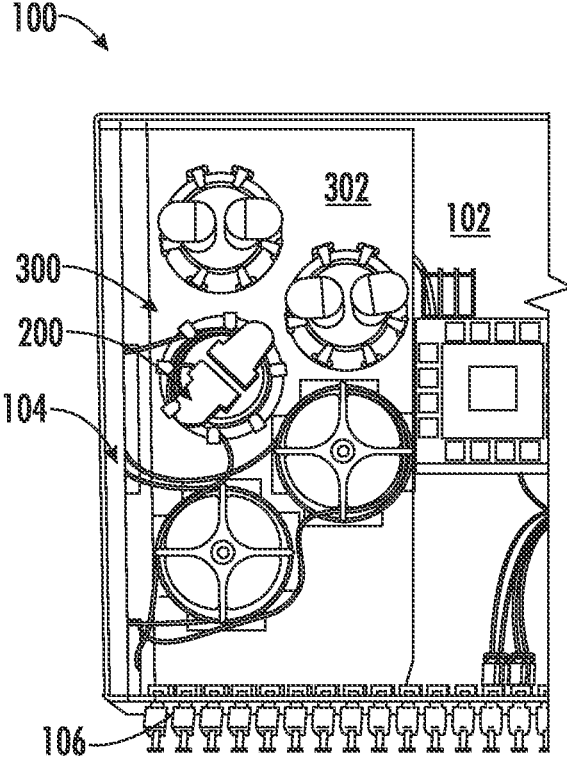
FIGS. 18 and 19 illustrates a top view of a tray having cable managers on the first face and second face, and including a plurality of optical fibers according to an example embodiment.
Figure 19:
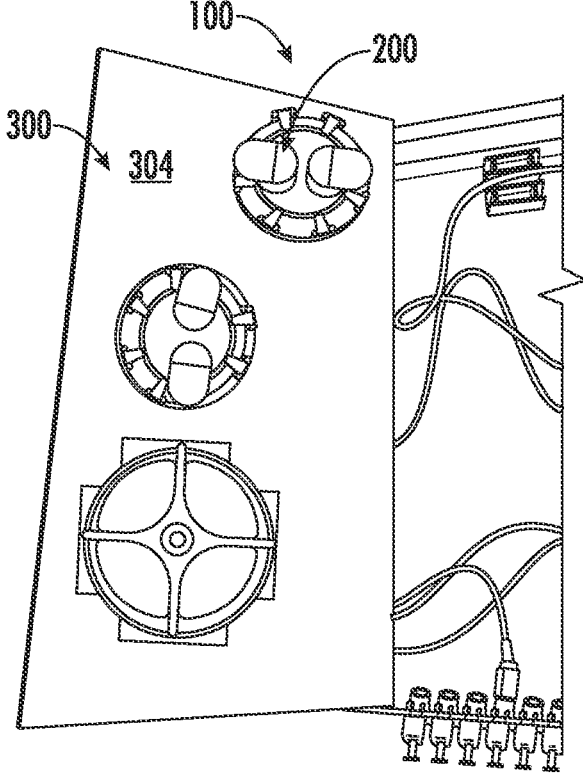

FIGS. 17-19 illustrate an example fiber optic assembly 100 including a plurality of cable managers 200 disposed on the base 102 of the fiber optic assembly 100 and the first face 302 and second face 304 of a tray 300. In FIGS. 17 and 18, the tray 300 is in the closed position. Cables 212 are routed through the gap between the tray 300 and the sidewall 104 to a plurality of cable managers 200 disposed on the first face 302 of the tray 300. Additional cables 212 are routed from an adaptor panel 106 to the switch 120 and cable slack is disposed in a second plurality of cable managers 200 disposed on the base 102 of the fiber optic assembly 100. FIG. 19 depicts additional cable managers 200 deposed on the second face 304 of the tray 300, that have not yet been populated. These additional cable managers 200 may be utilized as further connections are added to the fiber optic assembly 100.

In an example embodiment, a cable manager is provided including a base, a cable hub configured to rotate relative to the base, and a directional resistance element configured to allow rotation of the cable hub in a first direction and resist rotation of the cable hub in a second direction, that is opposite the first direction. The cable hub comprises a cable slot configured to receive at least one cable, such that when the cable hub is rotated the at least one cable is wound about a periphery of the cable hub.

In an example embodiment, the directional resistance element includes a ratchet element. In some example embodiments, the ratchet element includes a plurality of fingers disposed on the base or the cable hub and a plurality of resistance projections disposed on the other of the base or the cable hub. In an example embodiment, the resistance projections are tapered to enable rotation in the first direction. In some example embodiments, the base includes a socket configured to receive a portion of the cable hub. In an example embodiment, the cable hub includes a plurality of hooks configured received in the socket, such that the cable hub is rotatably coupled to the base. In some example embodiments, the cable manager includes at least one mounting feature configured to selectively mount the cable manager to a fiber optic assembly. In an example embodiment, the at least one mounting feature includes at least one magnet. In some example embodiments, the base or the cable hub includes one or more cable hooks configured to limit movement of the at least one cable parallel to the axis of rotation of the cable hub. In an example embodiment, the cable hub further includes a lid configured to cover the cable slot. In some example embodiments, the cable hub comprises two cylindrical structures configured to limit bending of the cable to greater to a predetermined bend radius.

In another example embodiment, a fiber optic assembly is provided including a housing base configured to support one or more fiber optic communication connections, a sidewall extending from the base, and at least one cable manager. The cable manager includes a base, a cable hub configured to rotate relative to the base, and a directional resistance element configured to allow rotation of the cable hub in a first direction and resist rotation of the cable hub in a second direction, that is opposite the first direction. The cable hub includes a cable slot configured to receive at least one cable, such that when the cable hub is rotated the at least one cable is wound about a periphery of the cable hub.

In some example embodiments, the fiber optic assembly also includes a tray pivotably mounted to the sidewall, the tray including a first face and an opposing second face. The base of the at least one cable manager is mounted to the first face or the second face of the tray. In an example embodiment, the tray is configured to pivot about a pivot point between an open position allowing access to the one or more fiber optic communication connections and a closed position limiting access to the one or more fiber optic communication connections. In some example embodiments, the tray is disposed below a plane defined by a distal end of the sidewall, when the tray is in the closed position. In an example embodiment, the at least one cable manager includes a plurality of cable managers disposed on the first face and the second face. In some example embodiments, the tray includes a fiber protection feature disposed between the sidewall and the pivot. In an example embodiment, the tray includes a layer switch feature enabling an optical cable to pass from the first face to the second face. In some example embodiments, the fiber optic assembly also includes a tray mount configured to provide an offset distance between the sidewall and a pivot of the tray. In an example embodiment, the fiber optic assembly also includes a plurality of trays, wherein each of the plurality of trays is mounted to the sidewall, and each tray of the plurality of trays includes a first face and an opposing second face. The at least one cable manager includes a plurality of cable managers and the base of each of the plurality of cable managers is mounted to the first face or the second face of the tray.

In a further example embodiment, a fiber optic assembly is provided including a housing base configured to support one or more fiber optic communication connections, a sidewall extending from the base an opto-electrical device supported by the base, an adaptor panel configured to receive one or more fiber optic adapters, at least one cable optically connecting the one or more fiber optic adaptors to the opto-electronic device, and at least one cable manager. The cable manager includes a base, a cable hub configured to rotate relative to the base, and a directional resistance element configured to allow rotation of the cable hub in a first direction and resist rotation of the cable hub in a second direction, opposite the first direction. The cable hub includes a cable slot configured to receive at least one cable, such that when the cable hub is rotated the at least one cable is wound about a periphery of the cable hub.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A fiber optic assembly comprising:
   a housing base configured to support one or more fiber optic communication connections;
   a sidewall extending from the housing base;
   an opto-electrical device supported by the base;
   an adaptor panel configured to receive one or more fiber optic adapters;
   at least one cable optically connecting the one or more fiber optic adaptors to the opto-electronic device; and
   at least one cable manager comprising:
      a base;
      a cable hub configured to rotate relative to the base; and
      a directional resistance element configured to allow rotation of the cable hub in a first direction and resist rotation of the cable hub in a second direction that is opposite the first direction,
   wherein the cable hub comprises a cable slot configured to receive the at least one cable, such that when the cable hub is rotated the at least one cable is wound about a periphery of the cable hub.

2. A fiber optic assembly comprising:
   a housing base configured to support one or more fiber optic communication connections;
   a sidewall extending from the housing base; and
   at least one cable manager comprising:
      a base;
      a cable hub configured to rotate relative to the base; and
   a directional resistance element configured to allow rotation of the cable hub in a first direction and resist rotation of the cable hub in a second direction that is opposite the first direction,
   wherein the cable hub comprises a cable slot configured to receive at least one cable, such that when the cable hub is rotated the at least one cable is wound about a periphery of the cable hub; and wherein the tray comprises a layer switch feature enabling an optical cable to pass from the first face to the second face.

3. The fiber optic assembly of claim 2 further comprising:
   a tray pivotably mounted to the sidewall, the tray comprising a first face and an opposing second face,
   wherein the base of the at least one cable manager is mounted to the first face or the second face of the tray.

4. The fiber optic assembly of claim 3, wherein the tray is configured to pivot about a pivot point between an open position allowing access to the one or more fiber optic communication connections and a closed position limiting access to the one or more fiber optic communication connections.

5. The fiber optic assembly of claim 4, wherein the tray is disposed below a plane defined by a distal end of the sidewall, when the tray is in a closed position.

6. The fiber optic assembly of claim 3, wherein the at least one cable manager comprises a plurality of cable managers disposed on the first face and the second face.

7. The fiber optic assembly of claim 3, wherein the tray comprises a fiber protection feature disposed between the sidewall and a pivot.

8. The fiber optic assembly of claim 3 further comprising:
   a tray mount configured to provide an offset distance between the sidewall and a pivot of the tray.

9. The fiber optic assembly of claim 2, further comprising:
   a plurality of trays, wherein each tray of the plurality of trays is mounted to the sidewall and comprises a first face and an opposing second face,
   wherein the at least one cable manager comprises a plurality of cable managers, and wherein the base of each of the plurality of cable managers is mounted to the first face or the second face of a respective tray of the plurality of trays.

10. A cable manager comprising:
   a base;
   a cable hub configured to rotate relative to the base; and
   a directional resistance element configured to allow rotation of the cable hub in a first direction and resist rotation of the cable hub in a second direction that is opposite the (first direction,
   wherein the cable hub comprises a cable slot configured to receive at least one cable, such that when the cable hub is rotated the at least one cable is wound about a periphery of the cable hub; and
   wherein the plurality of resistance projections are tapered to enable rotation in the first direction.

11. The cable manager of claim 10, wherein the directional resistance element comprises a ratchet element.

12. The cable manager of claim 11, wherein the ratchet element comprises:
   a plurality of fingers disposed on the base or the cable hub; and
   a plurality of resistance projections disposed on the other of the base or the cable hub.

13. The cable manager of claim 10, wherein the base comprises a socket configured to receive a portion of the cable hub.

14. The cable manager of claim 13, wherein the cable hub comprises a plurality of hooks configured to be received in the socket, such that the cable hub is rotatably coupled to the base.

15. The cable manager of claim 10, wherein the cable manager comprises at least one mounting feature configured to selectively mount the cable manager to a fiber optic assembly.

16. The cable manager of claim 15, wherein the at least one mounting feature comprises at least one magnet.

17. The cable manager of claim 10, wherein the base or the cable hub comprises one or more cable hooks configured to limit movement of the at least one cable parallel to an axis of rotation of the cable hub.

18. The cable manager of claim 10, wherein the cable hub further comprises a lid configured to cover the cable slot.

\*    \*    \*    \*    \*